United States Patent
Zhang et al.

(10) Patent No.: US 8,078,025 B2
(45) Date of Patent: Dec. 13, 2011

(54) VEHICLE DYNAMIC MEASUREMENT DEVICE AND METHOD FOR COMPREHENSIVE PARAMETERS OF RAIL WEAR

(75) Inventors: Guangjun Zhang, Beijing (CN); Junhua Sun, Beijing (CN); Zhenzhong Wei, Beijing (CN); Fuqiang Zhou, Beijing (CN); Qingbo Li, Beijing (CN); Zhen Liu, Beijing (CN); Qianzhe Liu, Beijing (CN)

(73) Assignee: Beihang University, Beijing (CN)

( * ) Notice: Subject to any disclaimer, the term of this patent is extended or adjusted under 35 U.S.C. 154(b) by 565 days.

(21) Appl. No.: 12/258,398

(22) Filed: Oct. 25, 2008

(65) Prior Publication Data

US 2009/0112487 A1    Apr. 30, 2009

(30) Foreign Application Priority Data

Oct. 26, 2007   (CN) .......................... 2007 1 0176429
May 13, 2008   (CN) .......................... 2008 1 0081873

(51) Int. Cl.
*G06K 9/00*     (2006.01)
*G01C 11/12*   (2006.01)

(52) U.S. Cl. .......................................... 385/106; 356/2

(58) Field of Classification Search .......... 356/2, 23–26; 382/108
See application file for complete search history.

(56) References Cited

FOREIGN PATENT DOCUMENTS

CN   1776364 A   5/2006

*Primary Examiner* — Hwa Lee
(74) *Attorney, Agent, or Firm* — Oppedahl Patent Law Firm LLC

(57) ABSTRACT

The invention discloses a vehicle dynamic measurement device for comprehensive parameters of rail wear, which comprises a vision sensor, a computer and a milometer. A high-speed image acquisition card and a measurement module are installed in the computer. The vision sensor comprises imaging system for rail cross-section and a raster projector which can project more than one light plane perpendicular to the measured rail. The measurement module is used for calculating vertical wear, horizontal wear, the amplitude and wavelength of corrugation wear. The invention also discloses a vehicle dynamic measurement method for comprehensive parameters of rail wear. The invention can increase the sampling rate of image sensing and acquisition hardware equipment with no need of improving the performance of it, thereby satisfy high-speed on-line dynamic measurement requirements for corrugation wear, and the amplitude and wavelength of corrugation wear can be calculated more precisely.

19 Claims, 8 Drawing Sheets

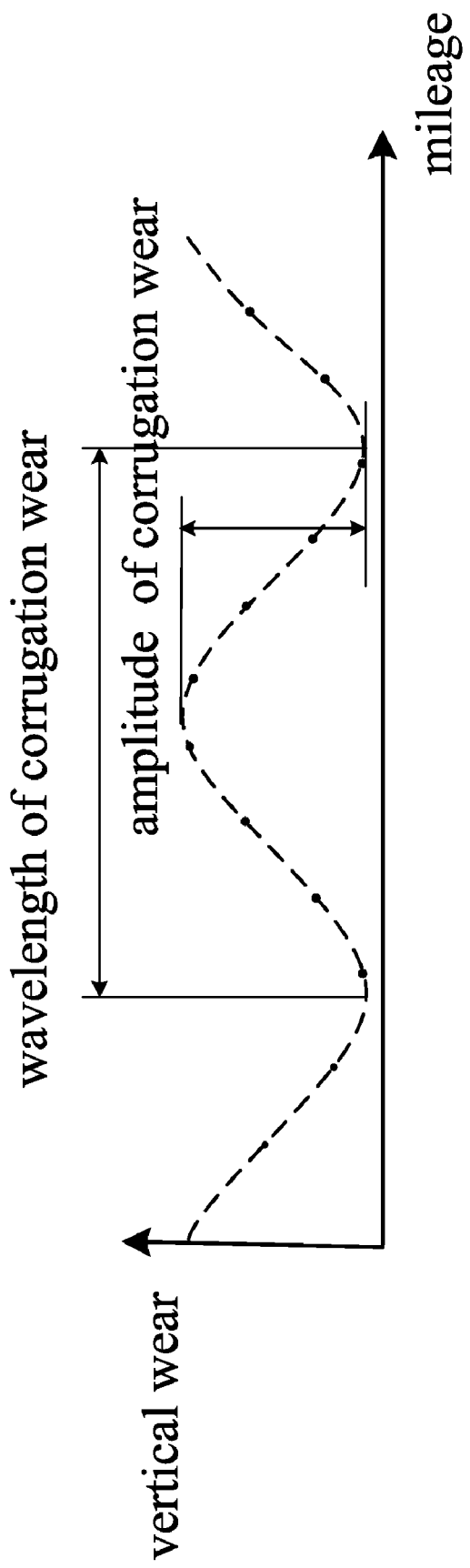

VEHICLE DYNAMIC MEASUREMENT DEVICE AND METHOD FOR COMPREHENSIVE PARAMETERS OF RAIL WEAR

TECHNICAL FIELD

The present invention relates to dynamic measurement technology, and more particularly, to vehicle dynamic measurement device and method for comprehensive parameters of rail wear.

BACKGROUND

Periodic detection for railway is very important for reasonable arrangement and maintenance in low cost in rail transportation. On the one hand, at the early stage of rail wear and distortion, railway detection contributes to making reasonable schedule of railway maintenance to avoid dangerous situation, on the other hand, effective railway detection establishes foundation for railway detection from periodic maintenance to state maintenance, thereby making full use of limit human and instrument resource and saving cost of rail maintenance effectively.

At present, many research institutes and scholars at home and abroad have made research on detection methods for rail wear and developed various measurement devices. These measurement devices can be divided into contact devices and non-contact devices according to detection mode. Among them, the contact measurement devices have high measurement precision, but the complex operation and low efficiency make them only suitable for static measurement, therefore they are mainly used for studying rail wear resistance performance in labs, and not suitable for on-line measurement.

The non-contact measurement devices are suitable for dynamic measurement. Chinese Patent Application Serial No. 200510123725.0, titled "Dynamic Measurement Device and Method for Rail Wear Based on Laser Vision" published a device which could measure rail vertical wear and horizontal wear only by placing a single-line vision sensor at the inner side of rail. The device enhances the measurement efficiency of rail wear, reduces the cost and improves the operability and convenience of engineering application. However, the vision sensor in the device only projects one light plane, therefore each image only includes one rail cross-section feature profile, which wastes a great deal of image information and consumes a great deal of time for image processing.

In recent years, with the acceleration of railway, the great development of and heavy-duty transportation, the great increase of passenger transport and goods traffic, and the density of traveling trains, the situation of rail wear is more and more serious. It can be seen from the analysis above that the sample rate and measurement precision of the current rail wear measurement equipments are not competent for corrugation wear measurement because of the limitation of the performances of image sensing and acquisition hardware devices. Therefore, the worn rails can not be maintained and replaced in time, which will result in higher transportation cost and affect transportation safety directly, even cause fatal accident.

At present, for the measurement of corrugation wear, the methods at home and abroad are generally divided into two types: inertia reference method and chord measurement method. Inertia reference method measures corrugation wear by axial accelerometer. Because this method requires time double integration to get wear value, it has the drift problem for long time integration. It is difficult that measured values of chord measurement method accord with real values because the transform function doesn't equal to 1 constantly and has principle error. Therefore, neither of them can measure corrugation wear precisely.

SUMMARY

It is the main purpose of the present invention to provide a vehicle dynamic measurement equipment and method for comprehensive parameters of rail wear. It solves the problem that sampling rate in existing dynamic measurement equipments is limited by the performance of image sensor and acquisition equipment and realizes the on-line dynamic measurement for vertical wear, horizontal wear and corrugation wear.

To achieve the above-mentioned purpose, the technical scheme of the invention is realized as follows.

A vehicle dynamic measurement device for comprehensive parameters of rail wear comprises a vision sensor, a computer and a milometer. A high-speed image acquisition card and a measurement module are installed in the computer. The vision sensor includes rail cross-section imaging system. The measurement module is used for calculating vertical wear, horizontal wear, amplitude and wavelength of corrugation wear. The vision sensor further includes a raster projector which is used for projecting more than one light plane perpendicular to the measured rail.

Furthermore, the angle between the optical axis of the imaging system for rail cross-section and the optical axis of the raster projector is from 30 to 75 degree.

Furthermore, the raster projector is composed of a semiconductor laser and optical system.

The invention provides a vehicle dynamic measurement method for comprehensive parameters of rail wear. The method comprises the following steps:

A. acquiring an image including several rail cross-section feature profiles and transmitting the acquired image and the corresponding mileage data into a computer.

B. acquiring the 3D profiles of each rail cross-section according to rail cross-section feature profiles in the image and the measurement model of structured-light vision, and obtaining the vertical wear and horizontal wear by comparing measurement profile with standard profile, said measurement model of structured-light vision comprising camera imaging model, camera parameters and structured-light equations; and C. calculating the amplitude and wavelength of corrugation wear by the obtained vertical wears and corresponding mileages.

Furthermore, step A comprises:

a raster projector projecting more than one light plane perpendicular to the measured rail, each light plane intersecting with the measured rail to form a rail cross-section feature profile; and a camera shooting rail cross-section feature profiles formed by light planes intersecting with the measured rail to get the image including several rail cross-section feature profiles.

Furthermore, before step A, the method further includes calibrating camera to get camera parameters and calibrating light planes to get structured-light equations.

Furthermore, the step of calibrating light planes to get structured-light equations comprises the following steps:

a. according to the camera location, setting up camera and image plane coordinate frames, respectively;

b. placing a planar target with feature points nonrestrictively in the measurement area of the vision sensor, and setting up target coordinate frame according to the location of the planar target, using camera to shoot the light stripes formed by projecting light planes onto planar target to get planar target image, then correcting distortion of the planar target images;

c. according to the target image of corrected distortion, getting the coordinates of several stripe points on the stripes formed by projecting light planes onto the planar target in the camera coordinate frame;

d. performing steps b and c repeatedly to get the coordinates of several stripe points on the stripes formed by projecting light planes onto the planar target in the camera coordinate frame; and e. fitting structured-light equations based on the obtained coordinates of the stripe points; the equation obtained by fitting the coordinates of all the stripe points in a light plane is considered as the structured-light equation of this light plane.

There are at least 3×3 feature points on the planar target in step b.

Furthermore, step c comprises:

c1. selecting three collinear feature points in image plane, and selecting one point arbitrarily as a virtual target feature point on the line going through the three collinear feature points and calculate cross-ratio between the virtual point and the three collinear feature points;

c2. selecting another two groups of feature points in the same row or column; wherein the selected three feature points in each group and the three collinear feature points in step c1 are in the same column or row, respectively; one virtual target feature point is chosen respectively in each line going through the three collinear feature points in each group, which makes the cross-ratio between this virtual target feature point and the three collinear feature points of the group equal to the cross-ratio calculated in step c1;

c3. getting the coordinates of the crossing points, namely stripe points, formed by the line through the three collinear virtual target feature points intersecting with each stripe in image plane, and calculating the cross-ratio between each stripe point and the three collinear virtual target feature points;

c4. calculating the coordinates of the real points corresponding to the virtual target feature points in the target coordinate frame according to the cross-ratio between a virtual target feature point and the three feature points along one line with the virtual feature point, and the coordinates of the corresponding point of the three feature points in the target coordinate frame, and calculating the coordinates of the real points corresponding to each stripe point in the target coordinate frame according to the cross-ratio between the stripe points on the image plane and the three collinear virtual target feature points and the coordinates of the three virtual target feature points in the target coordinate frame. then, transforming the coordinates of the real points corresponding to each stripe point from the target coordinate frame to the camera coordinate frame; and c5. repeatedly performing steps from c1 to c4 to get the coordinates of several stripe points on the stripes with the target in one position in the camera coordinate frame.

Furthermore, before step B, the method further includes determining the mileage data corresponding to each rail cross-section feature profile according to the mileage data corresponding to each image and the distance between light planes.

Furthermore, the method of calculating amplitude and wavelength of corrugation wear described in step C is:

C1. ordering vertical wears by their corresponding mileage data to get vertical wear discrete sequence;

C2. by interpolation and numerical differentiation, differentiate interpolation function, finding two successive mileages at each of which the derivative equals zero and calculating the two vertical wears corresponding to the two mileages respectively according to the interpolation function; and C3. calculating the absolute value of difference of the two mileages and defining it as half-wavelength of corrugation wear, and calculating absolute value of difference of the two vertical wear and defining it as amplitude of corrugation wear.

Furthermore, the vertical wears are obtained from the calculated vertical wears by using one or more images.

The vehicle dynamic measurement device and method for comprehensive parameters of rail wear use raster projector for high-speed dynamic rail wear measurement. A single-line structure light is replaced with a raster projected by the raster projector, so that each acquired image contains several rail cross-section feature profiles. The sampling rate can be increased with no need to improve the performances of image sensing and acquisition hardware equipments, i.e. the sampling rate of the dynamic measurement device is not limited by the performances of image sensing and acquisition hardware equipments, thereby satisfy the need of high-speed on-line dynamic measurement for corrugation wear at extremely high sampling rate.

The invention has increased the utilization ratio of image information. Corrugation wear is calculated using the digital signal processing method according to vertical wear discrete sequences, which solves the problem that time integration drift in inertia reference method and overcomes the defect that the transform function does not equal to 1 in chord measurement method.

BRIEF DESCRIPTION OF THE DRAWINGS

The accompanying drawings, which are incorporated in and constitute a part of specification, illustrate an exemplary embodiment of the present invention and, together with the general description given above and the detailed description of the preferred embodiment given below, serve to explain the principles of the present invention.

FIG. 9 is a schematic diagram for calculating the rail corrugation wear in the embodiment of the invention.

DETAILED DESCRIPTION

Figure 1:
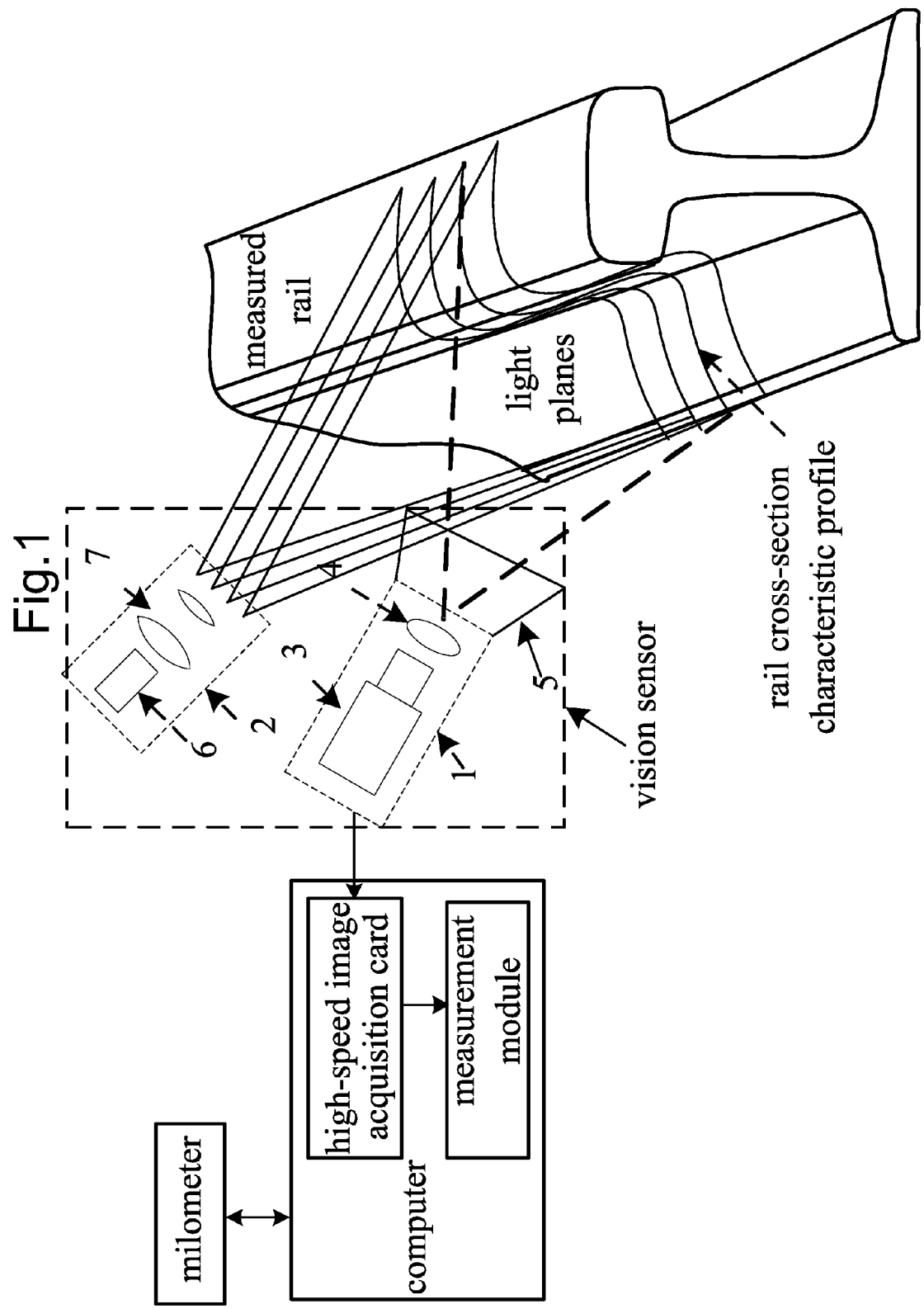
FIG. 1 is a diagram illustrating the structure of the vehicle dynamic measurement device for comprehensive parameters of rail wear in the embodiment of the invention.

While the claims are not limited to the illustrated embodiments, an appreciation of various aspects of the present invention is best gained through a discussion of various examples thereof. Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

As shown in FIG. 1, the vehicle dynamic measurement device for comprehensive parameters of rail wear in an embodiment of the invention comprises a vision sensor, a computer and a milometer. Generally, the computer is placed inside the carriage. A high-speed image acquisition card and a measurement module are installed inside the computer. The vision sensor comprises imaging system 1 for rail cross-section and a raster projector 2. The Imaging system for rail cross-section 1 is composed of a high-speed industrial CCD camera 3, a filter 4 and a light shield 5. The raster projector 2 is composed of a semiconductor laser 6 and an optical system 7. The raster projector 2 can project more than one light plane perpendicular to the measured rail. The angle between the optical axis of the imaging system for rail cross-section 1 and the optical axis of the raster projector 2 is from 30 to 75 degree. The vision sensor is fixed on the bottom of a train and is far from the measured rail from 300 mm to 700 mm. The measurement module is used for getting real rail cross-section profiles according to rail cross-section feature profiles and comparing measurement profile with standard profile in order to get vertical wear and horizontal wear. Further, according to obtained vertical wears, the amplitudes and wavelengths of corrugation wear are calculated by applying interpolation and numerical differentiation.

Figure 2:
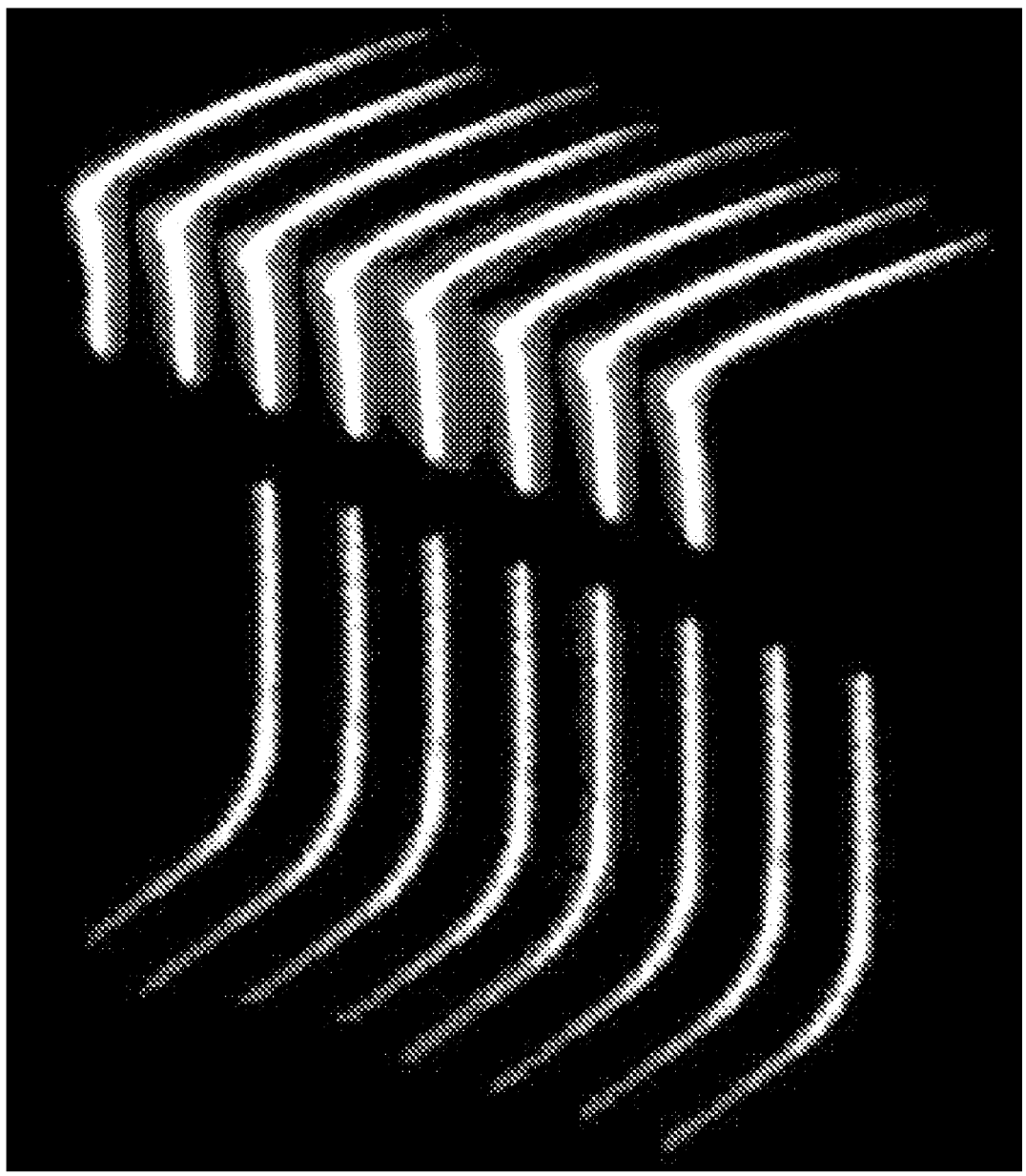
FIG. 2 is an image obtained by the vision sensor, containing eight rail cross-section feature profiles in the embodiment of the invention.

When measuring, the raster projector 2 projects more than one light plane perpendicular to the measured rail. Each light plane intersects with the measured rail to form a rail cross-section feature profile comprising rail head and rail waist. As shown in FIG. 2, all the rail cross-section feature profiles are contained in one image shot by the high-speed industrial CCD camera 3, i.e. several rail cross-section feature profiles can be obtained only by shooting one image. In this way, when train speed increases, sampling rate could be kept or raised only by increasing the number of light planes projected by the raster projector 2 in the case of keeping even lowering speed and performance requirements of the high-speed industrial CCD camera 3 and the high-speed image acquisition card. So, the dynamic measurement equipment described in the invention can measure rail corrugation wear more precisely. It is not limited by the performance of the CCD camera and the high-speed image acquisition card any more, which decreases the cost of the measurement device.

Figure 3:
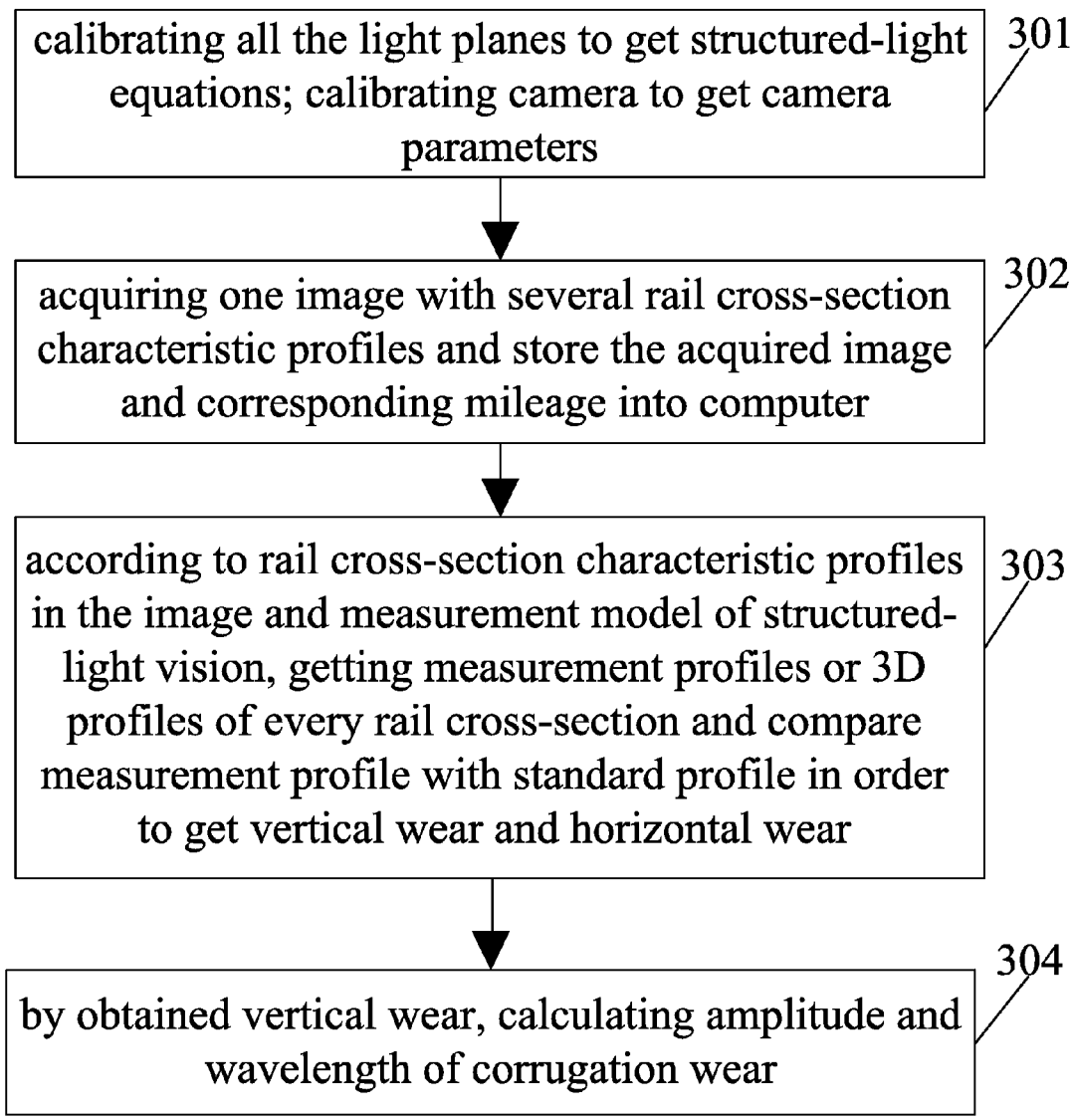
FIG. 3 is a flow chart illustrating the vehicle dynamic measurement method for comprehensive parameters of rail wear.

As shown in FIG. 3, the embodiment of the invention also provides a flow chart of the vehicle dynamic measurement method for comprehensive parameters of rail wear. The method comprises the following steps.

Step 301: Calibrating the camera to get camera parameters; calibrating the light planes projected by the raster projector to get structured-light equations.

In the embodiment, the camera is calibrated by the method of Z. Y. Zhang (A flexible new technique for camera calibration[R], Microsoft Corporation, NSR-TR-98-71, 1998).

In the embodiment, the method for structured-light sensor parameters calibration based on 2D cross-ratio invariant is used to calibrate the light planes. By the method, more calibration points could be obtained and structured-light with any model could be calibrated. The method is described in detail below.

Step A: Setting up image plane coordinate frame and camera coordinate frame according to the camera location.

Figure 4:
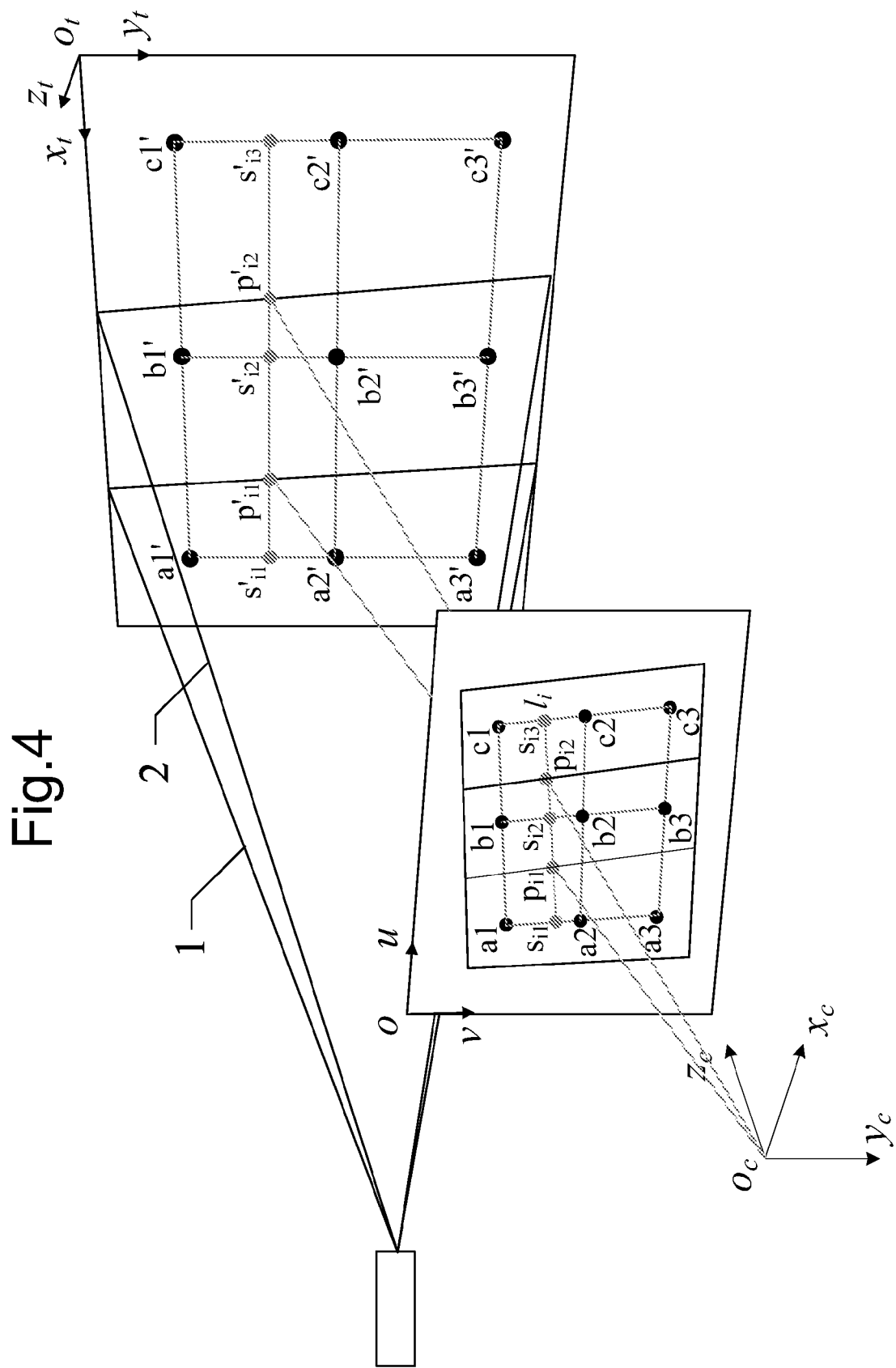
FIG. 4 is a schematic diagram illustrating structural parameters calibration of light plane sensor based on 2D cross-ratio invariant in the embodiment of the invention.

FIG. 4 is a schematic diagram illustrating structural parameters calibration of light plane sensor based on 2D cross-ratio invariant. As shown in FIG. 4, the camera coordinate frame $O_c$-$x_c y_c z_c$ and the image plane coordinate frame O-UV are set up according to the camera position.

Step B: Placing a planar target with feature points nonrestrictively in the measurement area of the vision sensor, and setting up target coordinate frame according to the position of the planar target. Planar target images are obtained by using camera to shoot light stripes formed by projecting light planes onto planar target, and then the distortion of the obtained planar target images is corrected.

Step B is described in detail below. A planar target with feature points is placed nonrestrictively in the measurement area of the vision sensor. Light stripes are formed by projecting light planes onto the planar target. Here, the planar target is set in advance and is a 2D plane with circular feature points on it. The number of these feature points is from 9 to 100. The diameter of these feature points is from 3 to 10 millimeter with the precision from 0.001 to 0.01 millimeter. The distance between adjacent points is from 3 to 150 millimeter with the precision from 0.001 to 0.01 millimeter. The shape of these feature points can also be square or other shapes.

Figure 5:
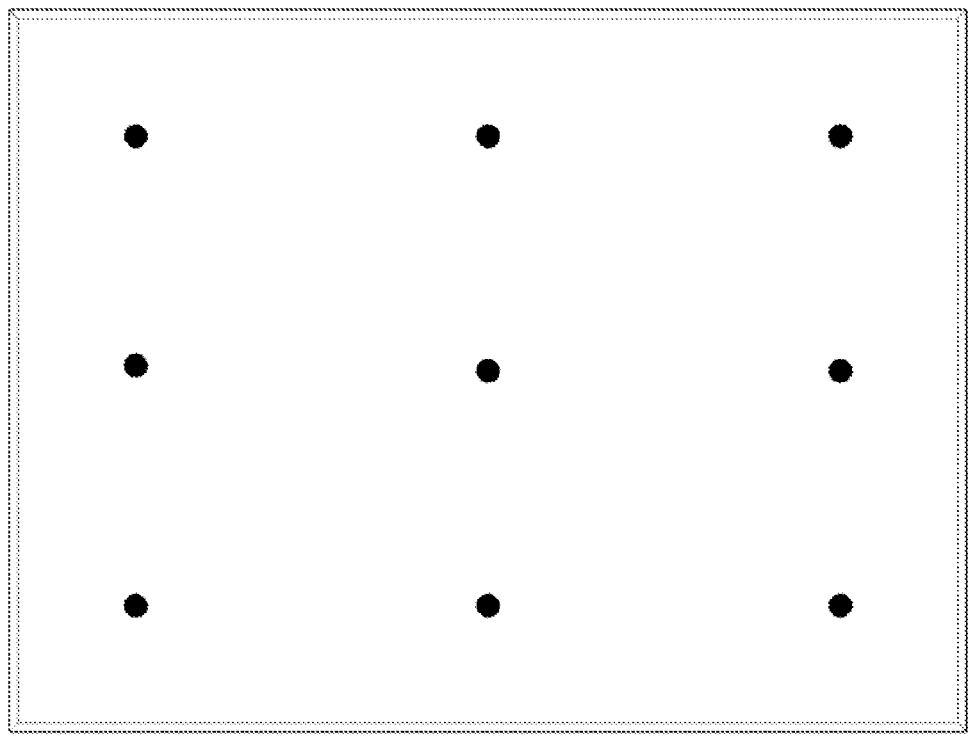
FIG. 5 is a diagram of the planar target in the embodiment of the invention.

FIG. 5 is a diagram of the planar target according to the embodiment of the invention. As shown in FIG. 5, in this embodiment, the planar target contains 9 circular feature points whose diameter is 5 millimeters. The planar target is 150 millimeters long and 150 millimeters wide. The horizontal distance between adjacent feature points is 60 millimeters and the vertical distance is 60 millimeters.

As shown in FIG. 4, target coordinate frame $O_t$-$x_t y_t z_t$ is set up according to the planar target location.

Here, the planar target image shot by the camera should include stripes and not less than 9 non-collinear feature points. The feature points are arranged in rectangle which has at least 3 rows and 3 columns. The distortion correction is to correct the distortion of the shot planar target image according to camera internal parameters. As for the correction method which is the existing technology, it is unnecessary to give details here.

Step C: Extracting the coordinates of at least 4 non collinear feature points and solve transformation relation from the target coordinate frame to the camera coordinate frame according to the coordinates of the extracted feature points.

The pixel locations of feature points are extracted by the shape arithmetic operator based on Hessian matrix. Then, the gray distribution curved surface around corners is described by second-order Taylor expansion. Finally, the coordinates of the feature points are extracted by calculating saddle points of curved surface.

The specific extraction method is described in detail in the paper, "A New Sub-Pixel Detector for X-Corners in Camera Calibration Targets[C], WSCG'2005 Short Papers Proceedings, 13th International Conference in Central Europe on Computer Graphics, Visualization and Computer Vision, 2005, Plzen, Czech Republic" written by Dazhi Chen.

The transformation relation from the target coordinate frame to the camera coordinate frame refers to rotation matrix R and translation vector T. Generally, the linear solution of 3×3 nomography matrix H from image plane to target plane is solved by the least square method using the coordinates of at least 4 non collinear feature points under image coordinate frame and corresponding coordinates under target coordinate frame $O_t$-$x_t y_t z_t$. Then, the optimal homography matrix H is solved using Levenberg-Marquardt optimization method. At last, the rotation matrix R and translation vector T from $O_t$-$x_t y_t z_t$ to $O_c$-$x_c y_c z_c$ are decomposed from matrix H.

The algorithms for calculating homography matrix H, rotation matrix R and translation vector T are described in detail in the paper of "A flexible new technique for camera calibration[R] (Microsoft Corporation, NSR-TR-98-71, 1998 )" written by Z. Y. Zhang. It is unnecessary to give details here.

Step D: Extracting the coordinates of the stripe points in the image.

In this step, the normal direction of the stripe and the second derivative in this direction are calculated through calculating Hessian matrix of the image points and the eigenvector of Hessian matrix corresponding to the eigenvalue with the maximal absolute value. The sub-pixel coordinates of the stripe center are finally extracted. The specific extraction method is described in the paper of "Unbiased Extraction of Curvilinear Structure from 2D and 3D Images [D] (Germany, Technology University Munich, 1998)" written by Carsten Steger.

Step E: Constructing three collinear virtual target feature points on the image plane.

The steps are described in detail below. At first, select three collinear feature points on the image plane and arbitrarily select one point on the line going through the three collinear feature points as a virtual target feature point. Calculate the cross-ratio between the virtual point and the three collinear feature points. As shown in FIG. 4, select a point $s_{i1}$ as one virtual target feature point on the line going through the three collinear feature points a1, a2, a3 in the image coordinate frame O-UV and calculate the cross-ratio $\alpha_{i1}$ between $s_{i1}$, a1, a2 and a3. Then, choose another two groups of collinear point set in the same column or row on the image plane. The selected three points in each group are in the same row or column with the three collinear feature points a1, a2 and a3, respectively. A virtual target feature point is respectively found in each line going through the three collinear feature points in each group, and the cross-ratio between this virtual point and the three collinear feature points in the group is equal to $\alpha_{i1}$. The point $s_{i2}$ and $s_{i3}$ on the two lines going through the other two groups of collinear feature points are found to meet the cross-ratios between $s_{i2}$, b1, b2 and b3 and between $s_{i3}$, c1, c2 and c3 to be equal to $\alpha_{i1}$, i.e., $s_{i2}$ and $s_{i3}$ are the other two virtual target feature points.

In the embodiment, because the planar target only includes nine feature points, the selected feature points are located in adjacent rows or columns. When the planar target includes more than nine feature points, feature points may be chosen in alternate row or column.

Step F: Getting the coordinates of the crossing points between the lines going through the three collinear virtual target feature points and all the stripes on the image plane, namely the coordinates of the stripe points.

In image coordinate frame, the points $s_{i1}$, $s_{i2}$, $s_{i3}$ are on the line $l_i$ according to geometric relation. The equation of the line $l_i$ is solved by the coordinates of any two points of the three points $s_{i1}$, $s_{i2}$, $s_{i3}$. There are two crossing points $p_{i1}$ and $p_{i2}$ between the line $l_i$ and the two stripes. The coordinates of $p_{i1}$, $p_{i2}$ can be calculated by the coordinates of the stripe points calculated in step D and the equation of the line $l_i$.

Step G: Calculating cross-ratios between the stripe points calculated in step F and the three collinear virtual target feature points respectively. i.e., calculate the cross-ratio $\beta_{i1}$ between $p_{i1}$ and $s_{i1}$, $s_{i2}$, $s_{i3}$ and the cross-ratio $\beta_{i2}$ between $p_{i2}$ and $s_{i1}$, $s_{i2}$, $s_{i3}$.

Step H: Getting the coordinates of real stripe points corresponding to the stripe points on the image plane in the target coordinate frame and transforming these coordinates to the camera coordinate frame. According to the principle of cross-ratio invariability between the chosen virtual target feature point and the three collinear feature points in perspective transformation, the coordinates of feature points a1', a2', a3', b1', b2', b3', c1', c2' and c3' in the target coordinates frame corresponding to feature points a1, a2, a3, b1, b2, b3, c1, c2 and c3 on the image plane and the cross-ratio $\alpha_{i1}$, calculate the coordinates of real points $s_{i1}'$, $s_{i2}'$ and $s_{i3}'$ in the target coordinates frame corresponding to virtual target feature points $s_{i1}$, $s_{i2}$ and $s_{i3}$. Then, according to the principle of cross-ratio invariability in perspective transformation between the stripe points on the image plane and the three collinear virtual target feature points, the coordinates of feature points $s_{i1}'$, $s_{i2}'$ and $s_{i3}'$ in the target coordinates frame $O_t$-$x_t y_t z_t$, and the cross-ratio $\beta_{i1}$, calculate the coordinates of the stripe point $p_{i1}'$ in the target coordinate frame corresponding to $p_{i1}$. Similarly, according to the coordinates of feature points $s_{i1}'$, $s_{i2}'$ and $s_{i3}'$ in the target coordinate frame $O_t$-$x_t y_t z_t$ and the cross-ratio $\beta_{i2}$, calculate the coordinates of the stripe point $p_{i2}'$ in the target coordinate frame corresponding to $p_{i2}$. Then, according to the rotation matrix R and the translation vector T obtained in step C, transform the coordinates of the stripe points $p_{i1}$ and $p_{i2}$ from the target coordinate frame to the camera coordinate frame.

The characteristics that both the cross-ratio between feature points on the image plane and virtual target feature points and the cross-ratio between virtual target feature points and stripe points keep invariable in perspective transformation is called 2D cross-ratio invariability principle.

Step I: Repeatedly performing steps from E to H to get the coordinates of several stripe points in the stripes in the same target position in the camera coordinate frame.

Step J: Nonrestrictively moving the planar target several times. Steps from B to I are performed repeatedly after each time of moving the planar target to get the coordinates of several stripe points in the stripes formed by projecting several light planes onto the planar target in different positions in the camera coordinate frame.

Step K: Fitting light plane equations based on the coordinates of all the stripe points obtained from steps H to J in the camera coordinate frame, and storing the equation parameters for following measurement.

Figure 6:
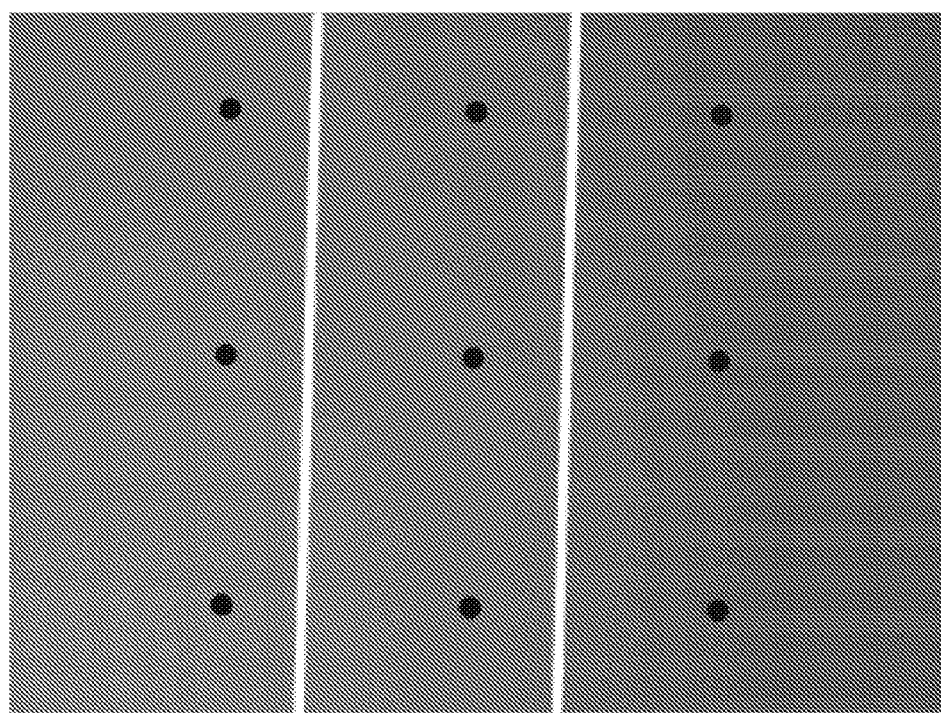
FIGS. 6 and 7 are respectively two images of the planar target in two different positions for calibrating structural parameters of the vision sensor in the embodiment of the invention.
Figure 7:
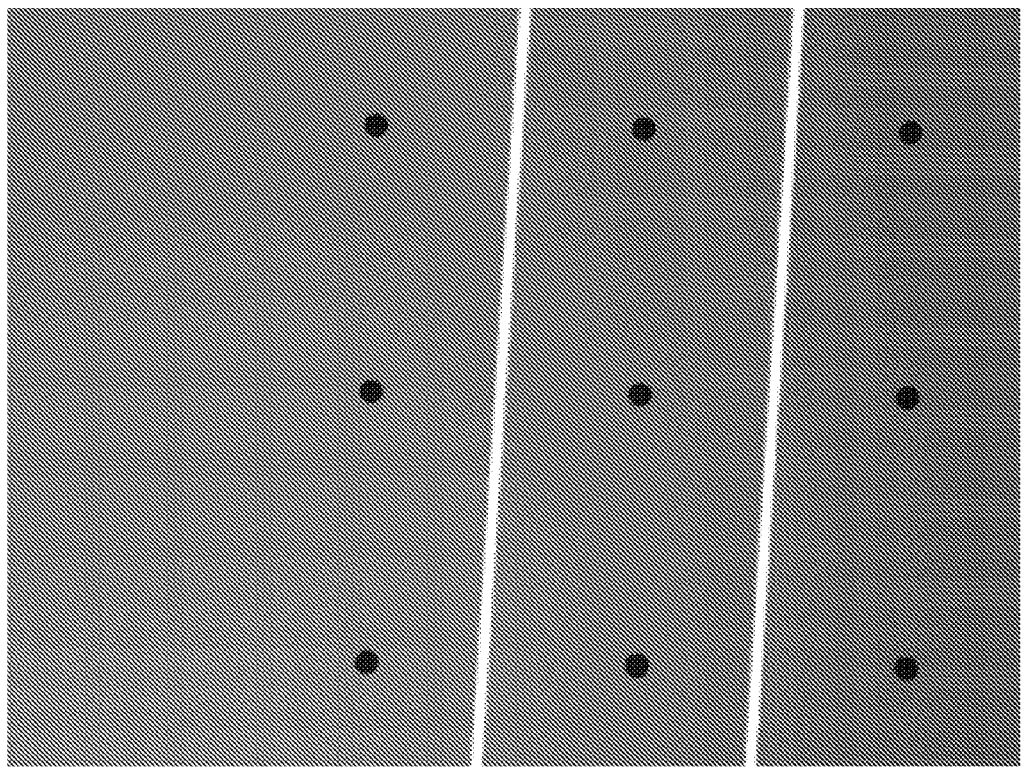

In the embodiment, nonrestrictively move the planar target two times, and get two images of the planar target respectively for calibrating sensor structural parameters, shown in FIGS. 6 and 7 using the method described in steps A and B. According to the existing technologies, camera internal parameters matrix and distorted coefficient are respectively obtained as follows:

$$A = \begin{bmatrix} 1988.707484 & 0.042218 & 432.748782 \\ 0 & 1985.440996 & 267.987208 \\ 0 & 0 & 1 \end{bmatrix}$$

$(k_1, k_2) = (-0.145617, 0.218327)$

According to the method described in step C, the rotation matrix $R_1$ and the translation vector $T_1$ from the target coordinate frame $O_t$-$x_t y_t z_t$ to camera coordinates frame $O_c$-$x_c y_c z_c$ with the target in the position shown in FIG. 6 are respectively calculated as follows:

$$R_1 = \begin{bmatrix} 0.959072 & -0.077754 & -0.272278 \\ -0.052515 & 0.896039 & -0.440859 \\ 0.278251 & 0.439114 & 0.855283 \end{bmatrix}$$

$$T_1 = \begin{bmatrix} -90.600549 \\ -5.100545 \\ 755.952995 \end{bmatrix}$$

When the target position shown in FIG. 6 is obtained using the method described from step E to step G, the coordinates of several stripe points in the image coordinate frame and the camera coordinate frame in the stripe formed by projecting light plane 1 onto the planar target in FIG. 4 are calculated as shown in Table 1.

TABLE 1

| the selected cross-ratio for constructing virtual points | the cross-ratio between stripe points and virtual points | the coordinates of stripe points on the image plane | the coordinates of real stripe points at the camera coordinate frame |
|---|---|---|---|
| 1.200 | 1.189 | (233.3, 285.8) | (−76.88, 6.89, 766.50) |
| 1.667 | 1.175 | (229.0, 318.8) | (−79.13, 19.75, 772.41) |
| 4.000 | 1.161 | (224.8, 351.2) | (−81.39, 32.61, 778.32) |
| −3.000 | 1.146 | (220.7, 383.1) | (−83.64, 45.48, 784.24) |
| −0.667 | 1.132 | (216.6, 414.6) | (−85.90, 58.34, 790.15) |
| −0.200 | 1.118 | (212.5, 445.6) | (−88.15, 71.20, 796.06) |

When the target position shown in FIG. 6 is obtained using the method described from step E to step G, the coordinates of several stripe points in the image coordinate frame and the camera coordinate frame in the stripe formed by projecting light plane 1 onto the planar target in FIG. 4 are calculated as shown in Table 2.

TABLE 2

| the selected cross-ratio for constructing virtual points | the cross-ratio between stripe points and virtual points | the coordinates of stripe points on the image plane | the coordinates of real stripe points at the camera coordinate frame |
|---|---|---|---|
| 1.200 | −1.115 | (359.1, 278.8) | (−28.92, 4.26, 780.41) |
| 1.667 | −1.317 | (354.0, 310.6) | (−31.13, 16.89, 786.22) |
| 4.000 | −1.519 | (349.1, 342.0) | (−33.35, 29.53, 792.03) |
| −3.000 | −1.721 | (344.1, 372.9) | (−35.56, 42.16, 797.83) |
| −0.667 | −1.923 | (339.3, 403.4) | (−37.78, 54.80, 803.64) |
| −0.200 | −2.125 | (334.5, 433.4) | (−39.99, 67.43, 809.45) |

According to the method described in step C, the rotation matrix $R_2$ and the translation vector $T_2$ from the target coordinate frame $O_t$-$x_t y_t z_t$ to the camera coordinate frame $O_c$-$x_c y_c z_c$ with the target in the position shown in FIG. 7 are respectively calculated as follows:

$$R_2 = \begin{bmatrix} 0.973928 & -0.038511 & -0.223563 \\ -0.082464 & 0.857968 & -0.507040 \\ 0.211336 & 0.512257 & 0.832424 \end{bmatrix}$$

$$T_2 = \begin{bmatrix} -31.108604 \\ 42.507594 \\ 639.697475 \end{bmatrix}$$

When the target position shown in FIG. 7 is obtained using the method described from step E to step G, the coordinates of several stripe points in the image coordinate frame and the camera coordinate frame in the stripe formed by projecting light plane 1 onto the planar target in FIG. 4 are calculated as shown in Table 3.

TABLE 3

| the selected cross-ratio for constructing virtual points | the cross-ratio between stripe points and virtual points | the coordinates of stripe points on the image plane | the coordinates of real stripe points at the camera coordinate frame |
|---|---|---|---|
| 1.200 | 1.293 | (408.6, 428.5) | (−7.92, 52.75, 652.17) |
| 1.667 | 1.259 | (407.2, 463.7) | (−8.45, 65.01, 659.49) |
| 4.000 | 1.224 | (406.0, 498.1) | (−8.97, 77.26, 666.81) |
| −3.000 | 1.190 | (404.7, 531.6) | (−9.50, 89.52, 674.14) |
| −0.667 | 1.155 | (403.5, 564.5) | (−10.02, 101.77, 681.46) |
| −0.200 | 1.121 | (402.3, 596.6) | (−10.55, 114.03, 688.78) |

When the target position shown in FIG. 7 is obtained using the method described from step E to step G, the coordinates of several stripe points in the image coordinate frame and the camera coordinate frame in the stripe formed by projecting light plane 2 onto the planar target in FIG. 4 are calculated as shown in Table 4.

TABLE 4

| the selected cross-ratio for constructing virtual points | the cross-ratio between stripe points and virtual points | the coordinates of stripe points on the image plane | the coordinates of real stripe points in the camera coordinate frame |
|---|---|---|---|
| 1.200 | −1.103 | (556.9, 404.5) | (41.39, 48.58, 662.87) |
| 1.667 | −1.326 | (553.6, 439.2) | (40.74, 60.84, 670.17) |
| 4.000 | −1.549 | (550.4, 473.3) | (40.09, 73.11, 677.46) |
| −3.000 | −1.772 | (547.3, 506.5) | (39.45, 85.37, 684.76) |
| −0.667 | −1.995 | (544.2, 539.1) | (38.80, 97.64, 692.05) |
| −0.200 | −2.218 | (541.2, 570.9) | (38.15, 109.90, 699.35) |

Finally, the structured-light equation of light plane 1, which is fitted based on the coordinates of the stripe points in the camera coordinate frame in Tables 1 and 3, is expressed as follows:

$$x-0.0951y+0.5879z-373.0910=0$$

The structured-light equation of light plane 2, which is fitted based on the coordinates of the stripe points in the camera coordinate frame in Tables 2 and 4, is expressed as follows:

$$x-0.0951y+0.5879z-429.4734=0$$

The camera parameters and the structured-light equations of light planes projected by the raster projector have obtained in step 301, which makes it possible that 3D profiles of rail cross-section can be calculated according to rail cross-section feature profiles, which is formed by the intersection of light planes projected by the raster projector with the measured rail, in the image shot by the camera.

When measuring, perform steps from 302 to 304:

Step 302: Acquiring one image including several rail cross-section feature profiles and transmitting the image and the corresponding mileage data into the computer.

Specific acquisition method comprises:

The raster projector projects more than one light plane perpendicular to the measured rail. Each light plane intersects with the measured rail to form a rail cross-section feature profile.

The camera shoots rail cross-section feature profiles formed by light planes intersecting with the measured rail to get the image including several rail cross-section feature profiles.

Step 303: Getting the measurement profiles of each rail cross-section, namely the 3D profiles of each rail cross-section, according to the structured-light vision measurement model using the rail cross-section feature profiles in the image. The vertical wear and the horizontal wear are obtained by comparing the measurement profile with the standard profile. The structured-light vision measurement model comprises camera imaging model, camera parameters and structured-light equations.

Figure 8:
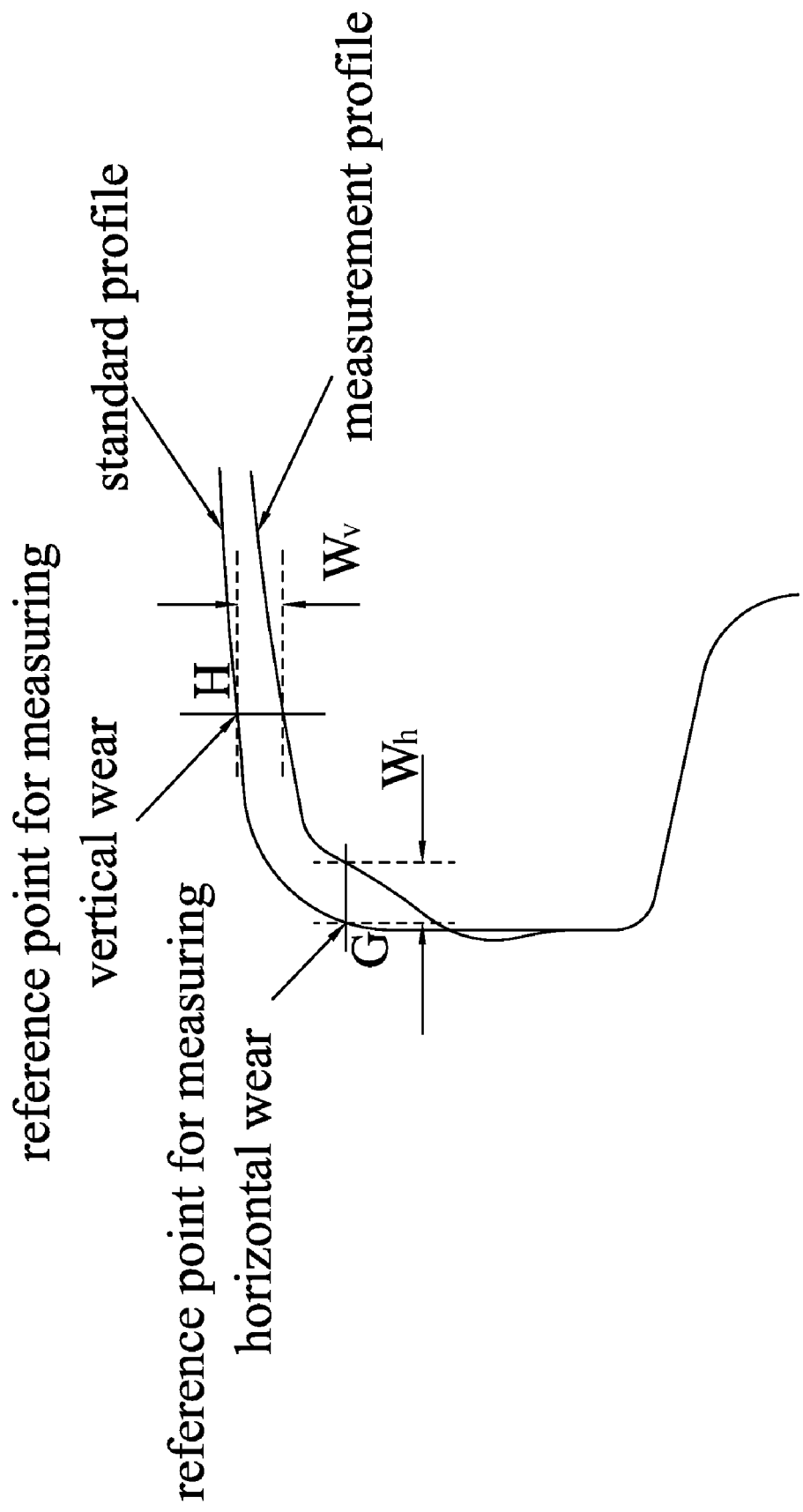
FIG. 8 is a schematic diagram for calculating the vertical wear and horizontal wear in the embodiment of the invention.

Concretely, as shown in FIG. 8, the point G is the reference point for measuring horizontal wear and the point H is the reference point for measuring vertical wear. The horizontal distance from point G to measurement profile is horizontal wear $W_h$, and the vertical distance from point H to measurement profile is vertical wear $W_v$.

Here, how to get 3D profiles of rail cross-section according to the measurement model of structured-light vision is described in "Machine Vision", pages 127-155, compiled by Guangjun Zhang, Science Press, 2005.

Before the measurement profiles of rail cross-section are calculated, the mileage data corresponding to each rail cross-section feature profile should be calculated according to the mileage data corresponding to each image and the distance between light planes.

Step 304: Calculating the amplitude and the wavelength of corrugation wear based on the obtained vertical wears.

In this step, the step of calculating amplitude and wavelength of corrugation wear are detailed as follows.

Step C1: Sorting the vertical wears according to its corresponding mileage data to get vertical wear sequences;

Step C2: Finding two successive mileages at each of which the derivative is equal to zero through differentiating the interpolation function using interpolation and numerical differentiation method. The two vertical wears corresponding to the two mileages are respectively calculated according to the interpolation function.

Step C3: As shown in FIG. 9, the absolute value of difference of the two mileages is calculated and defined as half-wavelength of corrugation wear. The absolute value of difference of the two vertical wear is calculated and defined as amplitude of corrugation wear.

Here, the vertical wears are obtained from the calculated vertical wears by using one or more images. The method of calculating corrugation wear by interpolation and numerical differentiation solves the problem of the time integration drift in inertia reference method and overcomes the defect that the transform function does not equal to 1 in chord measurement method.

The foregoing description of various embodiments of the invention has been present for purpose of illustration and description. It is not intent to be exhaustive or to limit the invention to the precise embodiments disclosed. Numerous modifications or variations are possible in light of the above teachings. The embodiments discussed where chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vehicle dynamic measurement device for comprehensive parameters of rail wear, comprising:
   a vision sensor including an imaging system for rail cross-section;
   a computer having a high-speed image acquisition card and a measurement module installed in it, said high-speed image acquisition card communicatively coupled with the vision sensor, said measurement module being communicatively coupled with the high-speed image acquisition card and used for calculating vertical wear, horizontal wear, the amplitude and wavelength of corrugation wear; and
   a milometer communicatively coupled with the computer; wherein said vision sensor further includes a raster projector which is used for projecting more than one light plane perpendicular to the measured rail, each light plane intersecting with a measured rail to form a rail cross-section feature profile; said imaging system for rail cross-section used for obtaining an image including several rail cross-section feature profiles.

2. The vehicle dynamic measurement device according to claim 1, wherein the angle between the optical axis of the imaging system for rail cross-section and the optical axis of the raster projector is from 30 to 75 degree.

3. The vehicle dynamic measurement device according to claim 1, wherein the raster projector is composed of a semiconductor laser and optical system.

4. The vehicle dynamic measurement device according to claim 2, wherein the raster projector is composed of a semiconductor laser and optical system.

5. A vehicle dynamic measurement method for comprehensive parameters of rail wear, comprising:
   A. acquiring an image including several rail cross-section feature profiles and transmitting the acquired image and its corresponding mileage data into a computer;
   B. acquiring the 3D profiles of each rail cross-section according to rail cross-section feature profiles in the image and the vision measurement model with structured-light, and obtaining the vertical wear and horizontal wear by comparing measurement profile with standard profile; said vision measurement model with structured-light comprising camera imaging model, camera parameters and structured-light equations; and
   C. calculating the amplitude and wavelength of corrugation wear based on the obtained vertical wear and its corresponding mileage, and outputting the calculated amplitude and wavelength of corrugation wear to a user.

6. The vehicle dynamic measurement method according to claim 5, wherein the step of acquiring an image in step A comprises:
   projecting by a raster projector more than one light plane perpendicular to the measured rail, each light plane intersecting with the measured rail to form a rail cross-section feature profile;

shooting by a camera the rail cross-section feature profiles formed by each light plane intersecting with the measured rail to get the image including several rail cross-section feature profiles.

7. The vehicle dynamic measurement method according to claim 6, wherein before step A, the method further includes:
calibrating said camera to get camera parameters; and
calibrating said light planes to get structured-light equations.

8. The vehicle dynamic measurement method according to claim 7, wherein the step of calibrating light planes to get structured-light equations comprises the steps of:
   a. according to the camera location, setting up camera and image plane coordinate frames, respectively;
   b. placing a planar target with feature points nonrestrictively in the measurement area of the vision sensor, and setting up target coordinate frame according to the location of the planar target; using camera to shoot light stripes formed by projecting each light plane onto planar target to get planar target image, then correcting the distortion of the planar target image;
   c. according to the corrected target image, getting the coordinates of several stripe points on the stripes formed by projecting each light plane onto the planar target in the camera coordinate frame;
   d. performing steps b and c repeatedly to getting the coordinates of several stripe points on the stripes formed by projecting each light plane onto the planar target in the camera coordinate frame; and
   e. fitting structured-light equations using the coordinates of the stripe points; the equation obtained by fitting the coordinates of all the stripe points in any light plane is considered as the structured-light equation of this light plane.

9. The vehicle dynamic measurement method according to claim 8, wherein there are at least 3×3 feature points on the planar target in step b.

10. The vehicle dynamic measurement method according to claim 8, wherein step c comprises the steps of:
   c1. selecting three collinear feature points in image plane, selecting one point arbitrarily as a virtual target feature point on the line going through the three collinear feature points, and calculating cross-ratio between the virtual point and the three collinear feature points;
   c2. selecting another two groups of feature points in the same row or column, the selected three feature points in each group being in the same column or row with the three collinear feature points in step c1, respectively, finding one virtual target feature point respectively in each line going through the three collinear feature points in each group and making the cross-ratio between this virtual point and the three collinear feature points of the group equal to the cross-ratio calculated in step c1;
   c3. getting the coordinates of the crossing points, namely stripe points, formed by the line through the three collinear virtual target feature points intersecting with each stripe in image plane, calculating the cross-ratio between each stripe point and the three collinear virtual target feature points;
   c4. calculating the coordinates of the real points corresponding to the virtual target feature points in the target coordinate frame according to the cross-ratio between a virtual target feature point and the three feature points along one line with the virtual feature point, and the coordinates of the corresponding point of the three feature points in the target coordinate frame; calculating the coordinates of the real points corresponding to each stripe point in the target coordinate frame according to the cross-ratio between the stripe points on the image plane and the three collinear virtual target feature points and the coordinates of the three virtual target feature points in the target coordinate frame; then, transforming the coordinates of the real points corresponding to each stripe point from the target coordinate frame to the camera coordinate frame; and
   c5. repeatedly performing steps from c1 to c4 to get the coordinates of several stripe points on the stripes with the target in one position in the camera coordinate frame.

11. The vehicle dynamic measurement method according to claim 5, wherein before step B, the method further includes:
determining the mileage data corresponding to each rail cross-section feature profile according to the mileage data corresponding to each image and the distance between light planes.

12. The vehicle dynamic measurement method according to claim 6, wherein before step B, the method further includes:
determining the mileage data corresponding to each rail cross-section feature profile according to the mileage data corresponding to each image and the distance between light planes.

13. The vehicle dynamic measurement method according to claim 7, wherein before step B, the method further includes:
determining the mileage data corresponding to each rail cross-section feature profile according to the mileage data corresponding to each image and the distance between light planes.

14. The vehicle dynamic measurement method according to claim 5, wherein step C of calculating amplitude and wavelength of corrugation wear comprises:
   C1. ordering vertical wears by their corresponding mileage data to get vertical wear discrete sequence;
   C2. by interpolation and numerical differentiation, differentiate interpolation function, finding two successive mileages at each of which the derivative equals zero and calculating the two vertical wears corresponding to the two mileages respectively according to the interpolation function; and
   C3. calculating the absolute value of difference of the two mileages and defining it as half-wavelength of corrugation wear; calculating the absolute value of difference of the two vertical wear and defining it as amplitude of corrugation wear.

15. The vehicle dynamic measurement method according to claim 6, wherein step C of calculating amplitude and wavelength of corrugation wear comprises:
   C1. ordering vertical wears by their corresponding mileage data to get vertical wear discrete sequence;
   C2. by interpolation and numerical differentiation, differentiate interpolation function, finding two successive mileages at each of which the derivative equals zero and calculating the two vertical wears corresponding to the two mileages respectively according to the interpolation function; and
   C3. calculating the absolute value of difference of the two mileages and defining it as half-wavelength of corrugation wear; calculating the absolute value of difference of the two vertical wear and defining it as amplitude of corrugation wear.

16. The vehicle dynamic measurement method according to claim 7, wherein step C of calculating amplitude and wavelength of corrugation wear comprises:

C1. ordering vertical wears by their corresponding mileage data to get vertical wear discrete sequence;

C2. by interpolation and numerical differentiation, differentiate interpolation function, finding two successive mileages at each of which the derivative equals zero and calculating the two vertical wears corresponding to the two mileages respectively according to the interpolation function; and C3. calculating the absolute value of difference of the two mileages and defining it as half-wavelength of corrugation wear; calculating the absolute value of difference of the two vertical wear and defining it as amplitude of corrugation wear.

17. The vehicle dynamic measurement method according to claim 14, wherein the vertical wears are obtained from the calculated vertical wears using one or more images.

18. The vehicle dynamic measurement method according to claim 15, wherein the vertical wears are obtained from the calculated vertical wears using one or more images.

19. The vehicle dynamic measurement method according to claim 16, wherein the vertical wears are obtained from the calculated vertical wears using one or more images.

* * * * *